April 2, 1935.  E. F. JONES ET AL  1,996,335
APPARATUS FOR THE PRODUCTION OF HOLLOW INGOTS
Filed May 2, 1933  5 Sheets-Sheet 2

Inventors:
Ernest Fraser Jones and
Wilhelm Mauss
By Emil Bömelyche
Attorney April 2, 1935.  E. F. JONES ET AL  1,996,335
APPARATUS FOR THE PRODUCTION OF HOLLOW INGOTS
Filed May 2, 1933   5 Sheets-Sheet 3

Inventors:
Ernest Fraser Jones and
Wilhelm Mayss
By Emil Bonnelyche, Attorney

April 2, 1935.  E. F. JONES ET AL  1,996,335
APPARATUS FOR THE PRODUCTION OF HOLLOW INGOTS
Filed May 2, 1933  5 Sheets-Sheet 5

Inventors:
Ernest Fraser Jones and
Wilhelm Mauss
By Emil Bönnelycke
Attorney

Patented Apr. 2, 1935

1,996,335

UNITED STATES PATENT OFFICE 1,996,335

APPARATUS FOR THE PRODUCTION OF HOLLOW INGOTS

Ernest Fraser Jones and Wilhelm Mauss, London, England, assignors, by direct and mesne assignments, to Fraser-Jones Limited, Johannesburg, Transvaal Province, Union of South Africa Application May 2, 1933, Serial No. 669,046
In Great Britain May 24, 1932

16 Claims. (Cl. 22—77)

The present invention refers to apparatus for the production of hollow ingots, more particularly hollow steel ingots, by a method such as that described in United States application Serial No. 647,050, filed Dec. 13, 1932, now matured into Patent 1,938,257 dated Dec. 5, 1933, in which a mould is partially filled with molten metal; a plunger is moved axially into the mould so as to displace some of the metal into the upper part of the mould and to bring the metal to the form of a hollow ingot; the metal as it assumes its new form is put under pressure by means of a collar movable independently of the plunger, and, upon the metal becoming sufficiently solidified to be self-sustaining, the plunger is withdrawn.

According to this invention the means for operating the collar is arranged to lower the collar into the mouth of the mould and there lock it, and after the plunger has fully descended, to force the collar further into the mould and so lock it again until the plunger has risen.

According further to this invention apparatus for producing hollow ingots comprises a conveyor adapted to carry a number of moulds, means to move the conveyor step by step to bring the moulds successively into a series of positions, and ingot hollowing mechanism at one position comprising a plunger operated as aforesaid, a member forming a guide for the plunger, means for raising and lowering said member, and a collar adapted to close the mouth of the mould around the plunger and carried by said member.

According further to this invention there is provided means for applying additional force for starting the upward movement of the plunger, said means being normally inoperative but being rendered available for operation by the plunger being in its lowered position and being brought into operation by delay of the starting of the plunger.

Further, according to the present invention, an ingot casting machine comprises an endless conveyor having a series of ingot moulds so attached that they are transported by it and can tilt relatively to it. Means are provided to move the conveyor step-by-step, so that each mould is stopped at each of a succession of stations. Means are provided at successive stations, to charge the vertically positioned mould with molten metal; optionally, to perform a manufacturing operation on the metal in the mould; to tilt down the ingot-containing mould; to eject the ingot from the mould; and to restore the mould to its vertical position, and further means are provided to cool the mould.

The invention further relates to a contractible plunger to facilitate withdrawal from the moulded ingot and to the mechanical disposition of the parts of the machine with a view to securing the desired pressure at the desired points in the cycle of operations.

The following is a description by way of example of certain constructions in accordance with the invention, reference being had to the accompanying drawings, in which:—

Figure 8ª is a detail section taken on line 8ª—8ª of Figure 8.

Figures 1, 2:
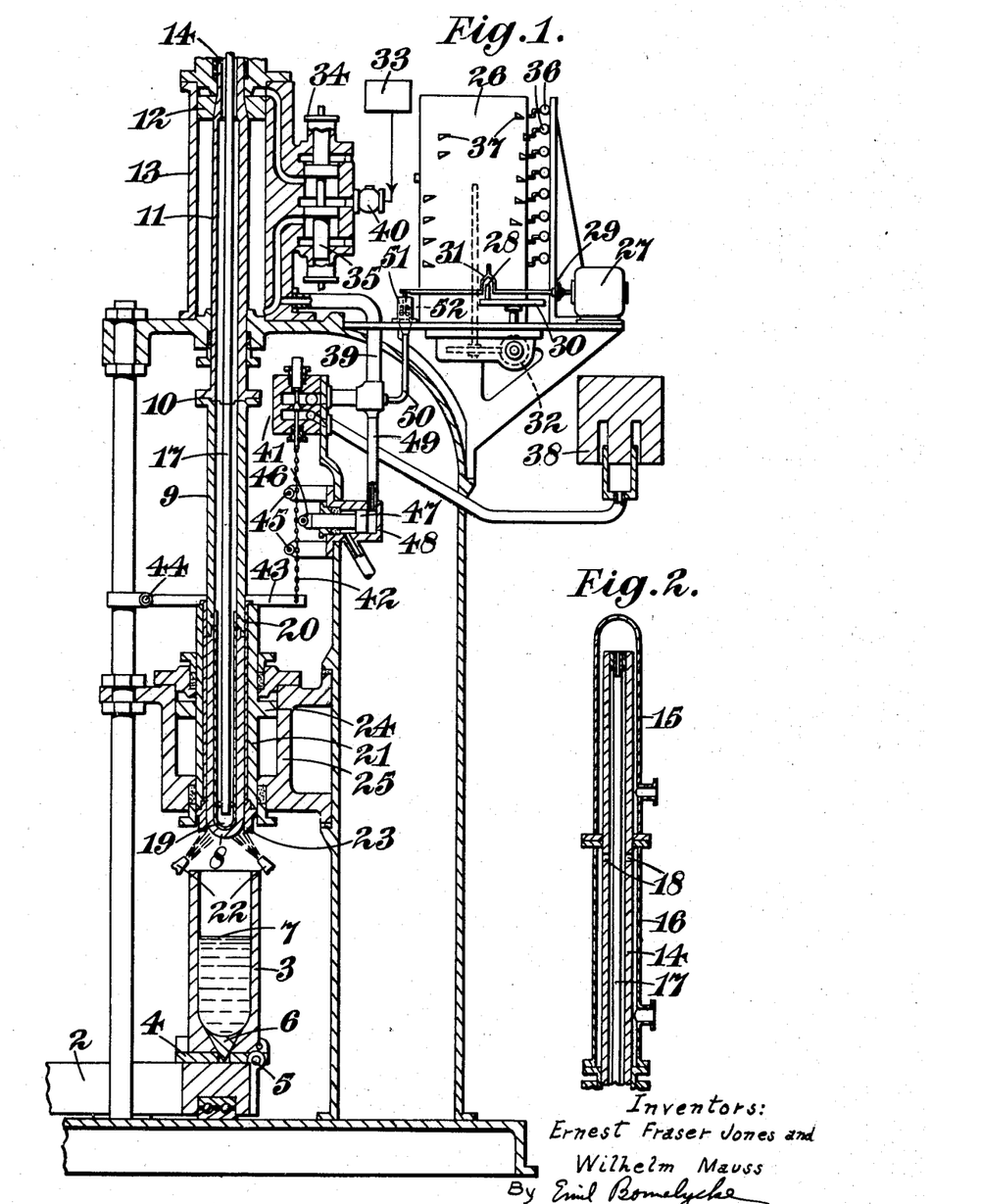
Figure 1 is a vertical section through a machine in accordance with the invention.
Figure 2 is a section showing an extended portion of the machine illustrated in Figure 1, which is broken off in the top of the said figure.

Referring to Figure 1, 2 indicates a rotary table or other conveyor device adapted to move a series of ingot moulds such as 3 step-by-step through a closed cycle of movements. The mould 3 is fixed to a base plate 4 which is hinged to the table at 5 so that the mould may be tilted for the purpose of discharging the ingot and reconditioning the mould. An aperture is provided in the bottom of the mould for the introduction of a push rod for dislodging the ingot; such aperture being fitted with a displaceable plug 6.

The mould 3 is shown in position for the plunging operation. In a previous step it has been charged with molten metal to about the level 7, Figure 1. In the present step the metal is displaced and brought to hollow form by the insertion into it of the plunger 8, which for this purpose is moved from its raised position of Figure 1 and lowered into the molten metal.

The plunger is a renewable member screwed or otherwise secured to a plunger rod 9. The latter is detachably secured, as by a flange joint 10, to a piston rod 11 extending from a piston 12 working in a cylinder 13. The piston rod is continued through the piston as a tail rod 14 extending through the top of the cylinder and into the two tandem casings 15, 16.

The plunger 8, plunger rod 9, piston rod 11 and tail rod 14 are hollow for the supply of cooling fluid to the interior of the plunger. Said fluid is supplied to casing 15 and passes into an axial pipe 17 which leads it to the bottom of the plunger 8; whence it returns through the plunger rod, the piston rod, the tail rod and side openings 18 in the latter into casing 16 and to exhaust. A liner 19 is fitted as a safeguard against leakage of fluid through the plunger wall in the event of its cracking. The flow of the fluid is controlled as hereafter described.

The plunger 8 works under severe conditions and is therefore made a separable part in order that it may be readily replaced. The plunger rod 9 is of the same diameter as the plunger and works with the latter through a bush 20 in the trunk 21 which acts as a steadying guide for them; and said plunger rod is consequently made a separable part so that when a plunger of different diameter is required, a corresponding plunger rod may be fitted.

Figures 3, 8:
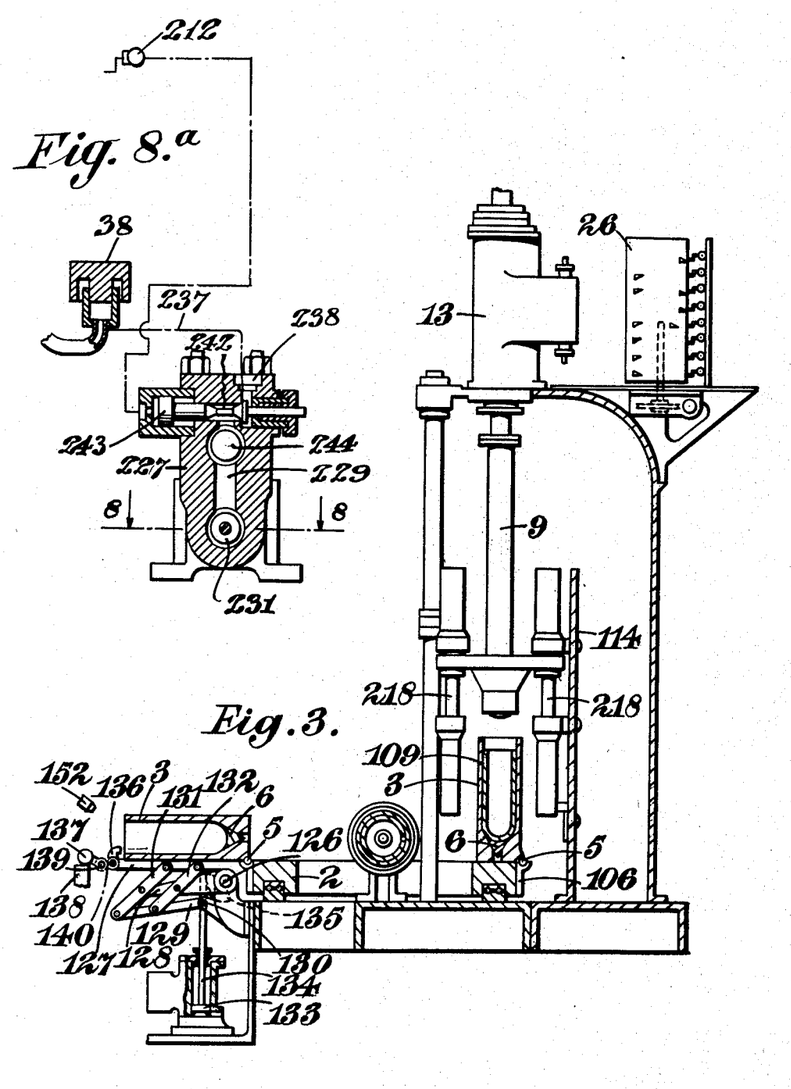
Figure 3 is a vertical section through a second form of machine.
Figure 8 is a diagram of hydraulic controls.

A series of nozzles 22 is arranged to deliver lubricant, such as graphite carried by compressed air upon the plunger 8 while the latter is rising. 23 indicates a collar which, upon being lowered around the plunger, as indicated in Figure 3, closes the mouth of the mould. Said collar is attached to the trunk 21 which is carried by an annular piston 24 working in the fixed cylinder 25. The bushing 20 and the collar 23 are substituted by others when the plunger is changed.

The movements of the various parts of the apparatus are controlled by a time control gear comprising a rotating drum 26 driven at constant speed from a motor 27. A friction pinion 28 is driven by the motor 27 through a flexible coupling 29 and drives a friction disc 30, the pinion being releasable from the disc to act as a clutch as hereafter described. The pinion is adjustable radially on the table by means of the fork 31; so permitting the speed of the drum to be changed. The table drives the drum through gearing 32.

Hydraulic power is preferably employed, the water under pressure being derived from a source indicated by 33. The various hydraulic motors, comprising the plunger motor 12, 13, collar motor 24, 25 and others not shown including the motor for rotating the table 2 step-by-step and motors for performing other operations on the ingot and the moulds, are each provided with a distributing valve such as 34 having a motor 35 in the form of a plunger for operating it. The several valve motors 35 are controlled by pilot valves 36 operated by sets of tappets 37 on the drum 26. One of these sets of tappets is arranged to close the exhaust from both sides of the trunk piston 24 so as to lock said piston at two points of its stroke as hereafter described.

Since the cooling ingot metal tends to seize on the plunger means are provided whereby specially high pressure water from a source 38 is available to ensure the initial upward movement of the plunger; but so that the high pressure water is not used unless it is required. For this purpose there is provided a connection 39 from the high pressure water supply 38 to the lower end of the cylinder 13; a non-return valve 40 being provided to prevent the high pressure water from entering the normal pressure water system.

Said high pressure connection 39 is controlled by a self-closing valve 41 arranged to be opened by tensioning the chain 42. Said chain is attached at its lower end to a rod 43 pivoted at 44 and positioned to be held down, by for instance the flange 10, when the plunger 8 is fully down. The chain can be kinked between two rollers 45 by a roller 46 carried by a piston 47. The latter is yieldingly retracted in its cylinder 48 as by low pressure water acting on its front face. The rear end of the cylinder 48 is put into communication with the lower end of the cylinder 13 by a pipe connection 49. A branch 50 from said pipe connection leads to the lower face of a ram 51 which is pressed down by a spring 52 and which upon being lifted, raises the friction pinion 28 off the disc 30.

The operation is as follows. A mould 3 having received its charge of molten metal, the appropriate set of the tappets 37 causes the table 2 to move one step, bringing such mould under the plunger 8. The collar 23 descends so as just to enter the mouth of the mould to prevent metal from being splashed out of the mould and to guide the plunger into the mould. It is locked in this position by the closing of the exhaust from both ends of the cylinder 25. The plunger 8 descends and stops at a fixed lowest point owing to the piston 12 contacting with the lower end of the cylinder 13. The collar 23 then moves down to exert pressure on the metal so as to consolidate the latter and is stopped by the resistance of the metal at a point which varies somewhat according to the amount of metal poured into the mould. The piston 24 is again locked whereby the collar 23 is held rigid so that it is ready to act as a stripper for the plunger, but ceases to exert further active pressure on the metal which would tend to break the weakly solidified metal during the withdrawal of the plunger. At about this time a rush of cooling fluid is sent through the plunger to cause it to contract and so detach itself from the ingot metal.

The tappets now cause low pressure fluid to be admitted under the piston 12 to raise the plunger out of the mold. A portion of such fluid passes, with a slight delay due to the pipe areas, to the cylinder 48 and pushes or tends to push out the piston 47. Provided the plunger raising has been effected at normal speed, the rod 43 will have been released by the flange 10, the chain 42 will be loose and the kinking of the chain by the piston 47 will have no effect on the valve 41.

If, however, the low pressure water has failed to start the plunger, the chain 42 will continue to be held taut by the rod 43, and kinking of the chain will cause the valve 41 to open; thereby admitting high pressure water from the reservoir 38 to the lower side of the piston 12 and ensuring the starting of the plunger. Such high pressure supply is immediately cut off by the release of the lower end of the chain 42, which permits the valve 41 to close. The piston 47 retracts when the pressure under piston 12 is exhausted for the next plunger stroke.

Whenever the high pressure water is thus brought into use, its pressure on ram 51 overcomes the resistance to spring 52, causing such ram to rise and lift the pinion 28. The control gear is thereby stopped and all further operations of the mechanism are suspended until the plunger is released.

Immediately after the plunger 8 commences to rise, the collar 23 is fully raised. This exposes the plunger during its rising movement, whereupon the nozzles 22 are brought into operation to blow lubricant upon the plunger and the collar 23. The table meanwhile makes another step and the operations are repeated.

In the construction illustrated in Figures 3 to 7 certain of the parts are similar to those illustrated in Figures 1 and 2, namely the moulds 3 pivoted on table 2 by pins 5, plunger 9, cylinder 13 and cam 26. The details of operation of the side plungers 218 are hereinafter more fully described in connection with Figure 8.

Figures 4, 7:
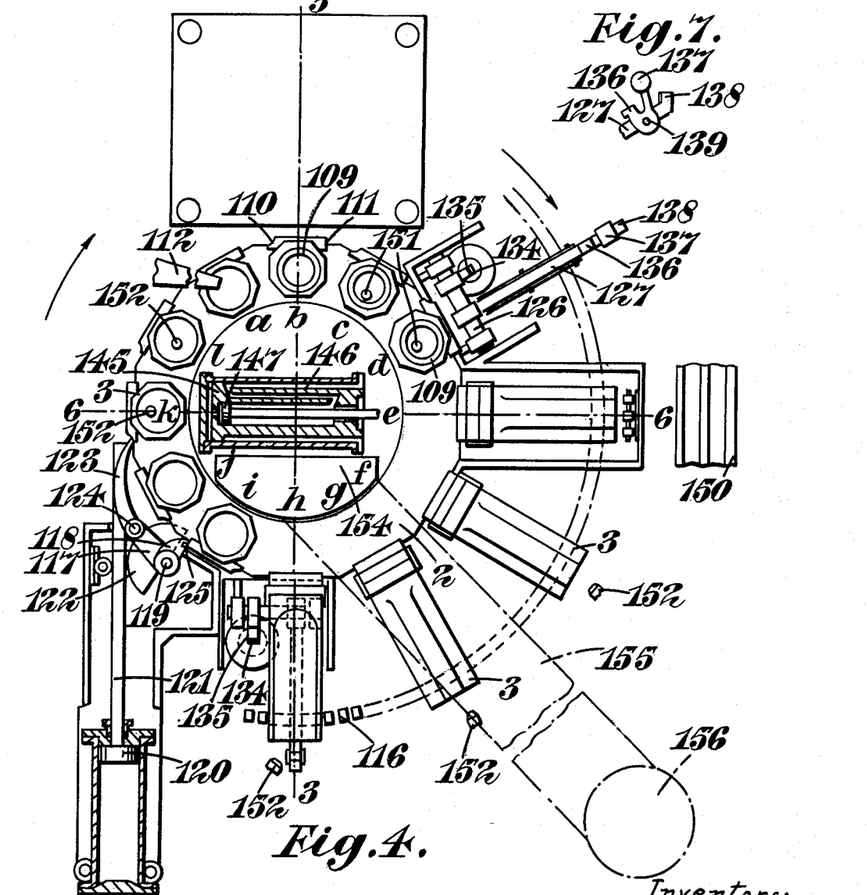
Figure 4 is a part sectional plan of a portion of the same.
Figures 5, 6 and 7 are details.
Figure 5:
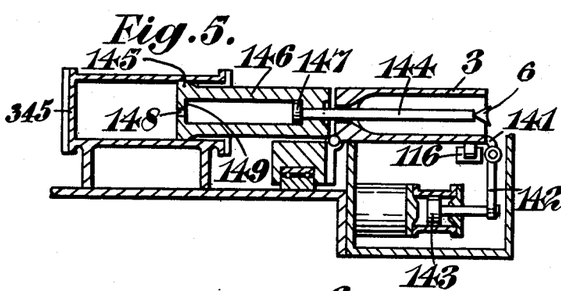
Figure 6:
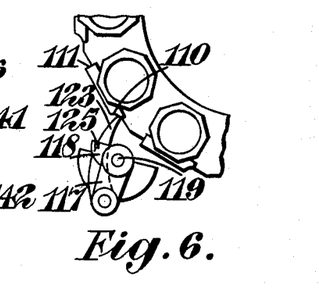
Figure 8:
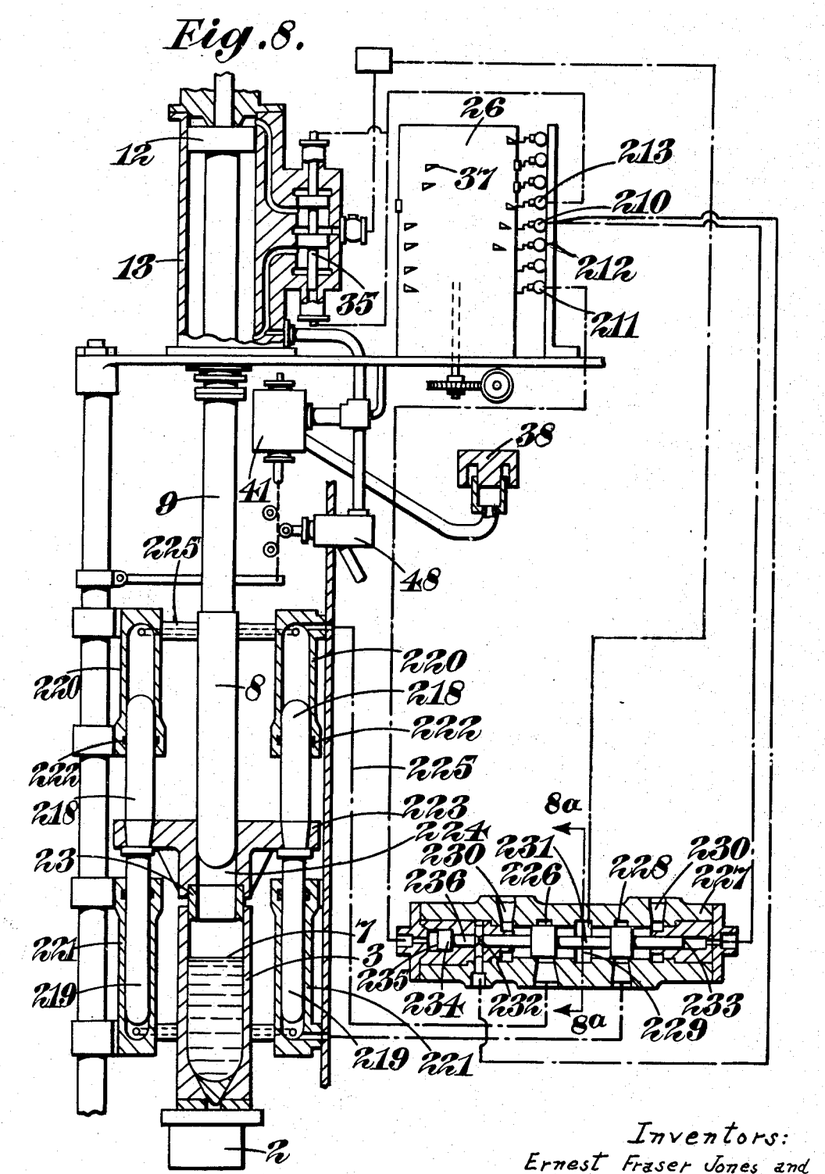

A series of ingot moulds 3—3 are provided, of which twelve are shown, this having been found a convenient number for carrying out the cycle of operations above described. The pin 5 seats in a half-round recess in a bracket 106 secured to the rotary annular table 2. The mould can thus rest vertically on the table or be tilted down to facilitate the ejection of the ingot; whilst its attachment to the table 2 is such as to enable it to be readily removed and replaced by a fresh one.

The twelve brackets 106 provide notches 110 and stops 111 with which the table stepping mechanism, hereinafter described, co-operates to move the table 2 and the moulds 3—3 therein one-twelfth of a revolution at each step.

The specific cycle of operations which the machine illustrated is adapted to perform is as follows. At station $a$ the mould is charged with molten steel from the stationary spout 112. At section $b$ the metal is brought to hollow form by the insertion and withdrawal from it of the plunger 9.

At station $d$ the ingot-containing mould is tilted, to allow the ejection at station $e$ of the ingot 109 and the conical plug 6 which closes the bottom of the mould. At station $h$ the mould is restored to a vertical position. 116 is a roller path on which the tilted moulds lie while moving from station $d$ to station $h$.

The table stepping mechanism comprises a bell crank 117, 118 fixed to a vertical shaft 119 which is outside the table periphery. Means are provided to oscillate the shaft 119, consisting of a fluid actuated piston 120 carrying a rack 121 meshing with a quadrant 122 fixed to the shaft 119.

On the working stroke, one arm 117 of the bell crank moves towards the table and in the direction of the movement of the periphery of the table indicated by the arrows. Said arm 117 carries a pawl 123 so directed as to be in all positions forward of a line between the centre of the table and its own pivot centre 124. The other arm 118 of the bell crank is so angularly disposed to the arm 117 that its terminal movement during the working stroke is opposite to the movement of the periphery of the table. Said arm 118 carries a heavy spring buffer 125. The pawl 123 during its forward movement, engages one of the notches 110 and so drives the table. As it is completing such movement the stop arm 118 brings its buffer 125 into contact with one of the stops 111 so that continued movement of the table by the pawl 123 compresses the buffer and the table is brought to rest without shock and is then held by the pawl and the stop arm 117 conjointly against movement in either direction. The plunging mechanism then operates and holds the table against movement while the stepping mechanism is retracted.

In order to tilt the moulds at the stations $d$ and $h$ rapidly but without shock, stationary means are provided at each of these stations to tilt the mould about its pivot 5 comprising a hinge pin 126 and a mechanism pivoted on the said hinge pin 126 and such as to constrain one of its members 127 for virtual hinging movement on the mould pivot 5 together with means for effecting a temporary connection between said member 127 and the mould. The mechanism shown for this purpose consists of a parallel link arrangement comprising a link 128, pivoted to the hinge 126, the mould-engaging member 127 parallel with the link 128, and, on the other side of the link 128, another link 129 parallel therewith and hinged to a pin 130 which is in a straight line with the mould pivot 5 and the hinge pin 126. Said three elements 127, 128, 129 are crossed by, and pin-jointed to two links 131, 132 each parallel with the line of the centres 5, 126, 130 just mentioned. Said link mechanism can tilt about the three fixed centres 5, 126, 130 between the vertical and substantially horizontal positions, while the mould engaging member 127 remains in stationary engagement with the side of the mould. The mechanisms are tilted as by means of fluid-actuated pistons 133, operating racks 134 and quadrants 135.

On each member 127 is pivoted a hook 136 for engaging the mouth of the mould. In the tilting down mechanism shown at station $d$ and in Figure 7 the hook is arranged to engage in the mouth of the mould when the mould and the member 127 are in a vertical position and to release the mould when the mould has reached a substantially horizontal position. The hook is provided with a weight 137 so positioned as to fall when the member 127 reaches its vetrical position and thereby engage the hook in the mould, and so also that it will not fall outwards against the stop 138 until the centre of gravity of the mould has passed outwards over its own pivot 5. When the mould has reached the substantially horizontal position the weight 137 causes the hook to fall clear of the mould leaving the latter free to be moved on to the next station.

The hook mechanism for restoring the mould to a vertical position has the weight 137 separately pivoted at 139 and connected to the pivoted hook as by means of tooth-gearing 140 so as to impart to the hook a movement opposite to its own. When the mould is in the substantially horizontal position the pivoted weight rests against the stop 138 thus keeping the hook out of the mould mouth. As the member 127 moves upward, the pivoted weight leaves its stop so that the hook engages the mould mouth. The weight tends to fall over its own centre and so release the hook before the mould has reached its vertical position; but the tilted weight of the mould keeps the hook engaged until the mould has seated itself on the table.

While the ingot 109 and plug 6 are being ejected from the mould at station $e$, means are provided to lock the mould against the heavy outward thrust, comprising a lever having a short arm 141 (Figure 5) which engages the rim of the mould, and a long arm 142 to which pressure is applied as by a fluid-actuated piston 143. The ingot is ejected by a push rod 144 of such diameter as to pass through the aperture for the plug 6 in the bottom of the mould, and about as long as the mould, so as to ensure the complete ejection of the ingot therefrom.

It is, however, undesirable that a rod of this length and diameter should be subjected, without adequate support, to the heavy pressure often required to start the ingot from the mould, and moreover it would be wasteful to continue the application of this heavy pressure once the ingot has been started.

In order to meet these conditions there is provided a large diameter cylinder 345 containing a piston 145 having a relatively large diameter piston rod 146, extending from its front end, there being only so much difference of diameter between the piston and piston rod as is necessary to effect the idle retraction of the piston 145. Such large diameter piston rod 146 is formed as a cylinder in which works the small diameter piston 147 and which is open rearwardly at 148 at the rear end of the push rod 144. At the commencement of the pushing operation the push rod 144 is housed for the greater part of its length in the piston rod 146 as shown in Figure 4, and the rear face of the small diameter piston 147 is subjected to the same fluid pressure as the rearward face of the large diameter piston 145, a stop 149 being provided to limit the inward movement of the small diameter piston 147 in its cylinder.

Accordingly when the fluid pressure is first applied it acts on the rearward faces of both the pistons 145 and 147 and the large diameter piston 145 moves forward carrying the small diameter piston 147 and its push rod 144 by means of a stop 149. After the piston 145 has moved forward a short distance sufficient to ensure that the ingot 109 has been started out of the mould, it is arrested against the forward end of the cylinder and the remaining ejecting movement of the ingot is effected by the continued movement of the piston 147 and push rod 144. The ingot is deposited onto a conveyor 150 which may transport it to a soaking pit, a reheating furnace or otherwise.

Nozzles 151 are positioned at stations c and d for supplying cooling air to the interior of the hollow ingot.

At stations f to l nozzles such as 152 are positioned for supplying air or air and graphite for cooling and reconditioning the moulds.

154 indicates an exhaust casing situated within the table 2 and connected by a trunk 155 to an exhaust fan or the like 156 for removing heated air.

Referring now to Figures 8 and 8a, the ingot mould 3 on table 2 is such as already described. In this figure the operation of lateral plungers 218 for controlling the collar 23 can be seen and also the necessary hydraulic controls. Certain reference numerals relating to parts already described illustrate the same parts in this figure.

The lateral plungers 218—219 working in cylinders 220—221 and packed at 222 constitute an hydraulic motor for operating the collar 23 as already described.

In Figure 8a are shown parts which also appear in Figure 8 to which the pipe connections of the valve casing as shown in Figure 8a are connected.

The collar 23 is secured to a cross head 223 having a bore 224 for the ingot plunger 8 to pass through. There are two or more hydraulic plungers 218 above and connected to the cross head to force it down, and two or more such plungers 219 below to raise it. The upper cylinders 220 are connected by piping 225 to the port 226 of the distributing valve casing 227, and the lower cylinders to the port 228. The live fluid inlet is indicated by 229 and the exhaust fluid outlets by 230. 231 is a piston slide valve by which the distribution of the liquid is effected. It is thrown alternately from end to end of the casing by pressure fluid admitted to and exhausted from its end faces 232, 233 by the pilot valve 210. The valve 210 is a two-way or double-operated valve opening one pipe (leading to face 233) to pressure and simultaneously the other pipe (leading to face 232) to exhaust, and vice versa.

To effect the locking of the collar 23 at the two positions above mentioned, means are provided for bringing the valve 231 to its mid position shown, at which all the ports are closed. For this purpose there is shown a piston 234 the pressure face 235 of which is larger than the opposite pressure face 233 of the valve 231 and to which pressure fluid is supplied under the control of the pilot valve 11. The piston 234 has a rod 236 extending to thrust on the valve 231; and its stroke is half that of the valve 231.

To provide for the additional pressure for compressing the ingot metal, a connection 237 is made between the valve casing 227 at 238 and a source of supply of high pressure water 38. This may be the same source as that described hereinabove for giving additional pressure under the plunger piston 12 to lift said plunger 9, and brought into use by the valves 38, 41.

The supply of such high pressure liquid is controlled by the self closing valve 242. Said valve is opened by means of a piston 243 to and from which pressure fluid is supplied and exhausted by pilot valve 212. The high pressure liquid is prevented from entering the low pressure line by a self closing valve 244.

The operation is as follows:

Pilot valve 210 is opened by the drum 214 and passes pressure fluid to throw the valve 231 to the left of the figure. Low pressure liquid enters the upper plunger cylinders 20 and liquid is exhausted from the lower plunger cylinders 221, whereby the collar 23 is lowered into the mouth of the mould. Pilot valve 211 thereupon operates to supply pressure fluid to the piston 234, throwing the valve 231 to its mid position. The collar 216 is thereby locked against either upward or downward movement.

Pilot valve 213 causes actuation of slide valve 35 whereby liquid is admitted above the piston 12 and exhausted from below it, causing the ingot plunger to move down and shape the hollow ingot. Immediately thereafter pilot valve 212 operates to open the high pressure liquid inlet valve 242: pilot valve 211 operates to release pressure on piston 234 so that the pressure face 233 again throws the valve 231 to the left, whereby the lower plunger cylinders are again exhausted and high pressure liquid is admitted to the upper plunger cylinders. The collar 23 is thereby forced down under heavy pressure and consolidates the shaped metal in the mould.

Pilot valve 211 then operates again to actuate piston 234 which again brings the valve 231 to its central position and thereby locks the collar 216. The consolidating pressure on the ingot metal, which, if continued, would crush the ingot during the withdrawal of the ingot plunger 9, is thus removed and the collar is held stationary to act as a stripper. Pilot valve 213 is actuated to cause the ingot plunger 9 to rise; its starting—if delayed—being assisted by high pressure liquid fed from the source 39 by means of the automatic valves 48, 41 as already described. Thereafter pilot valve 210 admits pressure fluid to the pressure face 232 of the valve 231 and exhausts it from face 233, throwing valve 231 to the right when it causes the collar 216 to rise out of the mould, so that the latter can be removed and replaced by another one containing a fresh charge of metal.

Figures 9 to 12 show constructions of plunger intended to cause the plunger automatically to contract and ease itself in the ingot when it becomes heated on plunging into the same.

Figures 9, 11:
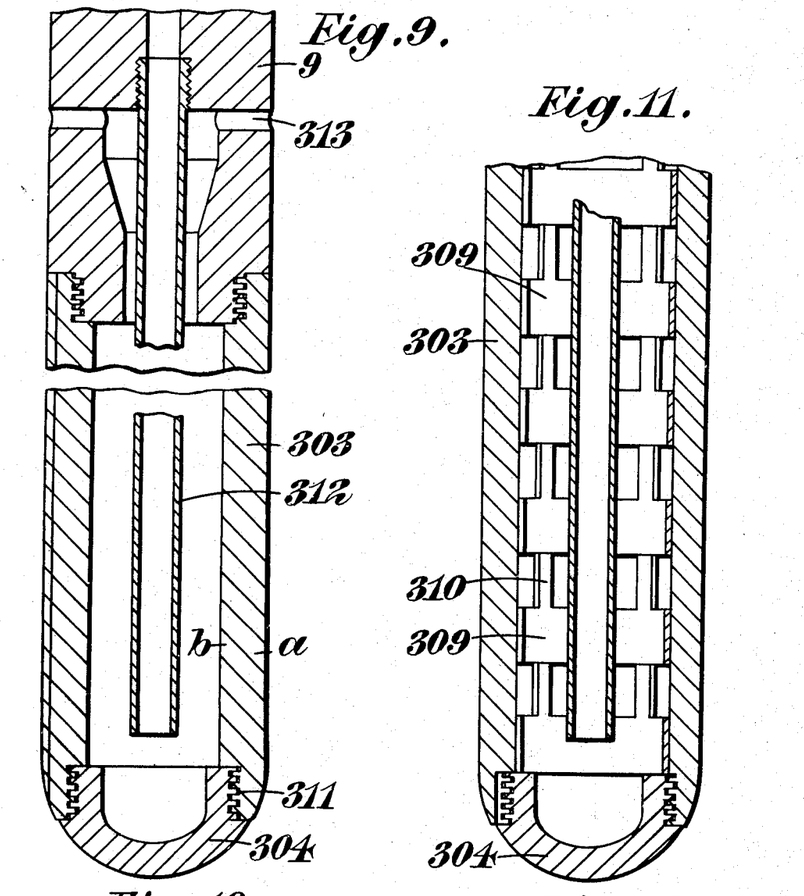
Figures 9 and 10 are longitudinal and cross sections respectively of a modified form of plunger.
Figures 11 and 12 are similar views of a second modified form of plunger.
Figure 10:
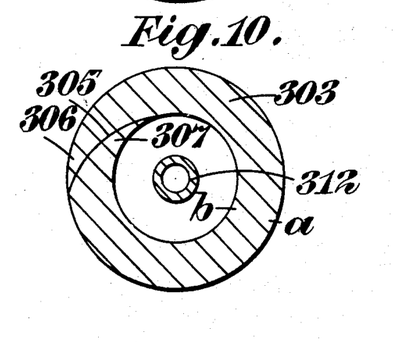

Referring to Figures 9 and 10, 9 indicates a plunger rod to which is attached the hollow cylinder 303 closed at its lower end by a head 304, which is preferably a separate part secured to the cylinder.

The wall of the cylinder is of suitable thickness to ensure the setting up and maintenance of a substantial difference of temperature between its outer and inner circumferential zones, $a$ and $b$, during the plunging operation; such thickness being in practice adequately provided for by the requirements for mechanical strength. Thereby differential expansion of said zones occurs, the outer zone tending to elongate circumferentially more than the inner zone. Such circumferential elongation being permitted by the split, the result is an increase of curvature of the wall circumferentially and consequent diminution of the diameter of the plunger which eases it in the ingot.

The wall is split at 305; the joint between the split edges 306, 307 being made by tapering and overlapping said edges 306, 307, as shown in Figure 10 so that they remain in contact whilst moving circumferentially relatively to one another. A cylinder of this formation may be constructed by tapering the edges of a flat plate and rolling the plate to cylindrical form with its tapered edges overlapping.

Figure 12:
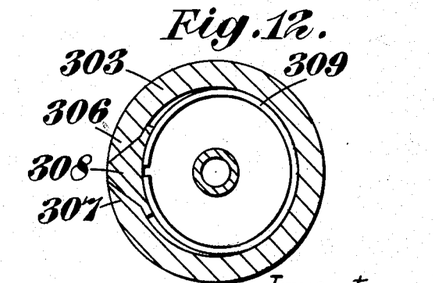

In the alternative construction shown in Figures 11 and 12 the split edges 306, 307 are cut away oppositely to provide an inwardly flaring gap, which is closed by a loose wedge 308. Said wedge is pressed between the edges by spring rings 309, so as to yield inwardly as the edges move together due to the increase of curvature of the wall.

The lowermost of these rings rests on the head 304 and the rings are provided with lugs 310 for spacing away and supporting the rings above them.

The connections of the cylinder 303 with rods and head 304 are such as to permit independent diametral variation of such parts. For this purpose there is shown a screw connection 311 on which the threads are square and on which there is substantial clearance between the male and female threads in the direction transverse to the axis of the plunger.

312 indicates a pipe extending into the plunger from the rod 9 for the purpose of delivering cooling fluid into the plunger; the used fluid passing away through outlets such as 313. In use the plunger is cooled internally in this way and also externally between plungings, as by means of fluid jets, so as to maintain it in an average temperature condition such as to ensure the differential expansion of its zones $a$, $b$ when it enters the hot metal.

We claim:

1. Apparatus for producing hollow ingots, comprising a conveyor adapted to carry a number of moulds, means to move the conveyor step by step to bring the moulds successively into a series of positions, ingot hollowing mechanism at one position above said conveyor comprising a plunger capable of movement axially into and from a mould on the conveyor below the ingot hollowing mechanism, means for forcibly lowering and raising the plunger, a guide for the plunger above said mould, means for raising and lowering said guide, and a collar adapted to close the mouth of the mould around the plunger and carried by said guide.

2. In apparatus for producing hollow ingots, the combination of an ingot mould, a plunger guided for vertical movement along the axis of the mould, plunger guides for the plunger, a collar about the plunger for closing the mould, means for forcibly lowering the plunger into the mould and raising it therefrom, and means for applying additional force for starting the upward movement of the plunger; said means being normally inoperative, but being rendered available for operation by the plunger being in its lowered position and being brought into operation by delay of the starting of the plunger.

3. Apparatus for producing hollow ingots comprising in combination an ingot mould, a plunger guided for vertical movement along the axis of the mould, guides for the plunger, a collar about the plunger for closing the mould, a hydraulic cylinder and piston for lowering and raising the plunger, a low pressure water supply connected to the cylinder for that purpose, an auxiliary high pressure water supply, having a connection to the appropriate end of the cylinder for raising the plunger, and a valve in such connection dependent for its opening upon the plunger being in its lowered position.

4. Apparatus as claimed in claim 2, having a hollow piston rod, a hollow plunger in continuation therewith and a hollow tail rod, an axial pipe extending through said parts, and means associated with the tail rod for circulating cooling fluid through the circuit thus formed.

5. In an ingot casting machine, the combination of an endless conveyor, a series of upright ingot moulds upon the conveyor, hydraulically operated means to advance the conveyor step by step, whereby each mould is stopped at a succession of stations, stationary means at one station for charging each mould on arriving at that station with molten metal, a plunger mounted above the moulds at a subsequent station so as to move along the axial line of the moulds at that station, means for guiding said plunger, hydraulic means for forcibly lowering and raising said plunger, a hydraulically actuated ejector for hollow ingots at a subsequent station, and means including a rotating drum containing valve actuating cams for actuating valves controlling the supply of liquid to the hydraulically operated means to correlate the movement of the plunger and of the conveyor so that the plunger is lowered and raised only when the conveyor is at rest.

6. In an ingot casting machine as claimed in claim 5, and in which the moulds are mounted to tilt on the conveyor, means at the ejecting station to tilt the mould about its pivot, comprising a hinge pin and mechanism pivoted on said hinge pin and such as to constrain one of its members for virtual hinging movement on the mould pivot, and means for effecting a temporary connection between said member and the mould for tilting the mould.

7. A machine as claimed in claim 5, in which the molds are mounted to tilt on the conveyor on mechanism which comprises a link pivoted on a stationary hinge pin, a mould engaging member parallel with said link, and a further link on the opposite side of the first-named link from the mould engaging member, said further link being pivoted at a point in line with the hinge pin and the mould pivot, said member and the two links being crossed by and pin-jointed to two links each parallel to the line of the pivots and hinge pin.

8. An ingot casting machine as claimed in claim 5, in which the means for ejecting the ingot from the mould comprises a fluid-actuated relatively large piston formed as a cylinder containing a smaller piston to which is attached a push rod adapted to enter an opening in the base of the mould, the relatively large piston having a piston rod which serves as a support for the push rod when the latter is retracted, the rear faces of both pistons being exposed to the same pressure fluid and a stop being provided to limit rearward movement of the smaller piston in the larger piston.

9. An ingot plunging machine as claimed in claim 2 and including an ingot mould, an ingot plunger movable into and from the mould and a collar movable into and from the mouth of the mould around the ingot plunger, and means for moving the collar into the mouth of the mould in advance of the plunger, then locking it, and again moving it downward after the plunger has reached its lowest position whereby it consolidates the metal shaped by the plunger, and means for applying to the collar during the second downward movement, pressure substantially in excess of that applied during the first movement.

10. Apparatus as claimed in claim 1, in which the collar is moved by a hydraulic motor and in which means are provided for supplying low pressure liquid to actuate said motor for the first lowering step and for raising the collar, and high pressure liquid for the second lowering step.

11. Apparatus as claimed in claim 5, wherein the plunger is hollow and split longitudinally, formed with a joint at the split edges such as to remain closed while permitting their relative circumferential movement, and closed at the bottom end by a disc secured to the plunger but non-integral therewith.

12. Apparatus as claimed in claim 5, wherein the plunger is hollow and split longitudinally, formed with tapered and overlapped split edges so as to remain closed while permitting their relative circumferential movement, and closed at the bottom end by a disc secured to the plunger but non-integral therewith.

13. Apparatus as claimed in claim 5, wherein the plunger is hollow and split longitudinally, formed with split edges bevelled to provide an inwardly flaring gap and having a wedge yieldingly pressed into said gap so as to close the gap.

14. In an apparatus of the character described, a mould, a plunger adapted to enter said mould, hydraulic means for moving said plunger into and out of said mould, a valve for connecting said hydraulic means to a source of liquid under pressure, and means, operable upon the failure of the hydraulic means to remove the plunger from the mould, for supplying a liquid under higher pressure to said hydraulic means.

15. In an apparatus of the class described, a mould, a plunger adapted to enter said mould, means for moving said plunger into and out of said mould, said means comprising a cylinder positioned above said mould, a piston slidable in said cylinder and carried by said plunger, a control valve for admitting a liquid under pressure into the upper end of said cylinder on the upper side of said piston to move the plunger into the mould and into the lower end of said cylinder on the lower side of the piston to remove the plunger from the mould, and means operable upon sticking of said plunger in the mould for placing the lower end of the cylinder in communication with a source of liquid under higher pressure.

16. In an apparatus of the class described, a mould, a plunger adapted to enter said mould, means for moving said plunger into and out of said mould, said means comprising a cylinder positioned above said mould, a piston slidable in said cylinder and carried by said plunger, a control valve for admitting a liquid under pressure into the upper end of said cylinder on the upper side of said piston to move the plunger into the mould and into the lower end of said cylinder on the lower side of the piston to remove the plunger from the mould, a loaded valve for placing the lower end of the cylinder in communication with a high pressure liquid supply conduit, a flexible member for opening said loaded valve, means effective upon the plunger entering the mould for removing slack from said flexible member, and means operable upon the operation of said control valve to supply liquid to the lower end of the cylinder for deflecting said flexible member to actuate the loaded valve.

ERNEST FRASER JONES.
WILHELM MAUSS.